US010540965B2

(12) United States Patent
Gandrabur et al.

(10) Patent No.: US 10,540,965 B2
(45) **Date of Patent: *Jan. 21, 2020**

(54) SEMANTIC RE-RANKING OF NLU RESULTS IN CONVERSATIONAL DIALOGUE APPLICATIONS

(71) Applicant: Nuance Communications, Inc., Burlington, MA (US)

(72) Inventors: Simona Gandrabur, Verdun (CA); Jean-Francois Lavallee, Verdun (CA); Real Tremblay, Outremont (CA)

(73) Assignee: Nuance Communications, Inc., Burlington, MA (US)

(*) Notice: Subject to any disclaimer, the term of this patent is extended or adjusted under 35 U.S.C. 154(b) by 12 days.

This patent is subject to a terminal disclaimer.

(21) Appl. No.: 15/700,438

(22) Filed: Sep. 11, 2017

(65) Prior Publication Data

US 2018/0075846 A1 Mar. 15, 2018

Related U.S. Application Data

(63) Continuation of application No. 14/314,248, filed on Jun. 25, 2014, now Pat. No. 9,761,225, which is a (Continued)

(51) Int. Cl.

| | |
|---|---|
| ***G06F 17/27*** | (2006.01) |
| ***G10L 15/18*** | (2013.01) |
| ***G10L 15/22*** | (2006.01) |

(52) U.S. Cl.

CPC ...... *G10L 15/1815* (2013.01); *G06F 17/2785* (2013.01); *G10L 15/22* (2013.01); *G06F 17/274* (2013.01)

(58) Field of Classification Search

CPC combination set(s) only.
See application file for complete search history.

(56) References Cited

U.S. PATENT DOCUMENTS 6,969,831 B1 11/2005 Parker et al.
7,092,928 B1 8/2006 Elad et al.
(Continued)

FOREIGN PATENT DOCUMENTS

WO 0021074 A1 4/2000

OTHER PUBLICATIONS

Statement RE: Related Applications dated May 19, 2015.
(Continued)

*Primary Examiner* — Vu B Hang
(74) *Attorney, Agent, or Firm* — Brian J. Colandreo; Micheal T. Abramson; Holland & Knight LLP

(57) ABSTRACT

Multiple natural language understanding (NLU) interpretation selection models may be generated. The NLU interpretation selection models may include a generic NLU interpretation selection model that is not specialized for a specific set of NLU interpretations type and one or more specialized NLU interpretation selection models, each of which may be specific to a particular set of NLU interpretations type. The specialized NLU interpretation selection model(s) may be utilized to process natural language input data comprising data corresponding to their respective sets of NLU interpretations type(s). The generic NLU interpretation selection model may be utilized to process natural language input data comprising data that does not correspond to the sets of NLU interpretations type(s) associated with the specialized NLU interpretation selection model(s).

20 Claims, 10 Drawing Sheets

AT&T 3G 7:27 PM
Flight reservation for...
Expedia SIGN IN
Boston, MA (BOS) to Miami, FL (MIA)
Choose a departing flight
Sorted by: Price
Sort by: Duration Go
Roundtrip: $344.70
Tue 13-Mar
10:30 am - Depart Boston
6:30 pm - Arrive Miami
Duration: 8hr 0mn AT&T 3G 7:31 PM
When was the battle...
Web
When was the battle
Closest Matching Answer
when was the battle of bunker hill
Answer: The Battle of Bunker Hill took place on June 17, 1775. Additional information about the Battle of Bunker Hill can be found at http://www.britishbattles.com/bunker-hill.htm.
Bunker Hill Battle
All About Bunker Hill Battle Bunker Hill Battle in One Site!

AT&T 3G 7:21 PM
How much is 3.14x4
WolframAlpha
How much is 3.14×4
Input:
3.14×4
Result:
12.56
Rational approximation:
314 14

Related U.S. Application Data continuation-in-part of application No. 13/793,854, filed on Mar. 11, 2013, now Pat. No. 9,269,354.

(56) References Cited

U.S. PATENT DOCUMENTS

| | | | | |
|---|---|---|---|---|
| 7,509,313 | B2 * | 3/2009 | Colledge | G06F 17/2785 |
| 9,761,225 | B2 * | 9/2017 | Gandrabur | G10L 15/1815 |
| 2002/0042707 | A1 | 4/2002 | Zhao et al. | |
| 2002/0123891 | A1 | 9/2002 | Epstein | |
| 2005/0049852 | A1 | 3/2005 | Chao | |
| 2007/0156392 | A1 * | 7/2007 | Balchandran | G06F 17/27 704/9 |
| 2008/0208586 | A1 | 8/2008 | Ativanichayaphong et al. | |
| 2010/0030723 | A1 | 2/2010 | Au | |
| 2010/0114944 | A1 | 5/2010 | Adler et al. | |
| 2011/0112921 | A1 | 5/2011 | Kennewick et al. | |
| 2011/0258543 | A1 | 10/2011 | Larsson et al. | |
| 2013/0086029 | A1 | 4/2013 | Hebert | |
| 2013/0152092 | A1 | 6/2013 | Yadgar | |
| 2013/0246315 | A1 | 9/2013 | Joshi et al. | |

OTHER PUBLICATIONS

Final Office Action dated Apr. 21, 2015, issued in U.S. Appl. No. 13/793,822.
Amendment filed Feb. 9, 2015, in U.S. Appl. No. 13/793,822.
Non-Final Office Action dated Dec. 4, 2014, issued in U.S. Appl. No. 13/793,822.
Amendment filed May 18, 2015, in U.S. Appl. No. 13/793,805.
Non-Final Office Action dated Feb. 18, 2015, issued in U.S. Appl. No. 13/793,805.
International Search Report and Written Opinion of International Application No. PCT/US2015/037318, dated Oct. 19, 2015.
Mar. 22, 2016—U.S. Non Final Office Action—U.S. Appl. No. 14/314,248.
Jul. 5, 2016—U.S. Office Action—U.S. Appl. No. 14/314,248.

* cited by examiner

SEMANTIC RE-RANKING OF NLU RESULTS IN CONVERSATIONAL DIALOGUE APPLICATIONS

CROSS-REFERENCE TO RELATED APPLICATIONS

This application is a continuation of and claims priority to U.S. patent application Ser. No. 14/314,248, filed Jun. 25, 2014, and entitled "Semantic Re-Ranking of NLU Results in Conversational Dialogue Applications," which is a continuation-in-part of and claims priority to U.S. patent application Ser. No. 13/793,854, filed Mar. 11, 2013, and entitled "Semantic Re-Ranking of NLU Results in Conversational Dialogue Applications," the disclosures of which are incorporated by reference herein in their entirety.

FIELD

This application generally relates to natural language processing applications, and more specifically, to identifying and resolving anaphora that occur in conversational dialogue applications.

BACKGROUND

Natural Language Processing (NLP) and Natural Language Understanding (NLU) involve using computer processing to extract meaningful information from natural language inputs such as human generated speech and text. One recent application of such technology is processing speech and/or text queries in multi-modal conversational dialog applications such as for mobile devices like smartphones.

FIG. 1 shows some example screen shots of one such conversational dialogue application for a mobile device, Dragon Go!, which processes speech query inputs and obtains simultaneous search results from a variety of top websites and content sources. Such conversational dialogue applications require adding a natural language understanding component to an existing web search algorithm in order to extract semantic meaning from the input queries. This can involve using approximate string matching to discover semantic template structures. One or more semantic meanings can be assigned to each semantic template. Parsing rules and classifier training samples can be generated and used to train NLU models that determine query interpretations (sometimes referred to as query intents).

In a typical conversational dialog application, there are several interconnected components:

- the dialogue manager (DM), which decides what the next action should be after each user input,
- the automatic speech recognition engine (ASR), which translates spoken utterances into sequences of text words,
- the natural language understanding engine (NLU), which maps the words into semantic interpretations, or concepts, and
- the client, typically the component which resides on a mobile device or embedded platform and deals with visual displays and touch input.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

Aspects of the disclosure are directed to a human-machine dialogue arrangement. In some embodiments, the arrangement may include multiple computer-implemented dialogue components, which may be configured to intercommunicate and use context to narrow down understanding, recognition, and/or reasoning errors. A user client may deliver output prompts to a human user and may receive dialogue inputs including speech inputs from the human user. An automatic speech recognition (ASR) engine may process the speech inputs to determine corresponding sequences of representative text words. A natural language understanding (NLU) engine may process the text words to determine corresponding semantic interpretations. A dialogue manager (DM) may generate output prompts and/or respond to the semantic interpretations so as to manage a dialogue process with the human user. The dialogue components may share context information with each other using a common context sharing mechanism such that the operation of each dialogue component reflects available context information.

In some embodiments, the context sharing mechanism may be based on key value pairs including a key element characterizing a specific context type and a value element characterizing a specific context value. The context information may include dialog context information reflecting context of the dialogue manager within the dialogue process. For example, the dialogue context information may include one or more of:

- a belief state reflecting collective knowledge accumulated during the dialogue process,
- an expectation agenda reflecting new information expected by the dialogue manager,
- a dialogue focus reflecting information most recently prompted by the dialogue manager, and
- one or more selected items reflecting user dialogue choices needed by the dialogue manager.

In some embodiments, the context information may include client context information, for example, reflecting context of the user client within the dialogue process and/or NLU context information reflecting context of the NLU engine within the dialogue process.

Aspects of the disclosure are directed to a human-machine dialogue arrangement with multiple computer-implemented dialogue components that may perform a semantic re-ranking of NLU results in conversational applications using dialogue context and world knowledge. A user client may deliver output prompts to a human user and may receive dialogue inputs from the human user including speech inputs. An automatic speech recognition (ASR) engine may process the speech inputs to determine corresponding sequences of representative text words. A natural language understanding (NLU) engine may process the text words to determine corresponding NLU-ranked semantic interpretations. A semantic re-ranking module may re-rank the NLU-ranked semantic interpretations based on at least one of dialog context information and world knowledge information. A dialogue manager may respond to the re-ranked semantic interpretations and may generate output prompts so as to manage a dialogue process with the human user.

In some embodiments, the semantic re-ranking module may re-rank the NLU-ranked semantic interpretations using dialog context information characterized by a context sharing mechanism using key value pairs including a key element characterizing a specific context type and a value element characterizing a specific context value. Additionally or alternatively, the semantic re-ranking module may re-rank the NLU-ranked semantic interpretations using dialogue context information including one or more of: a belief state reflecting collective knowledge accumulated during the dialogue process, an expectation agenda reflecting new information expected by the dialogue manager, a dialogue focus reflecting information most recently prompted by the dialogue manager, and one or more selected items reflecting user dialogue choices needed by the dialogue manager.

In some embodiments, the semantic re-ranking module may re-rank the NLU-ranked semantic interpretations using dialog context information that includes NLU context information reflecting context of the NLU engine within the dialogue process. The semantic re-ranking module may re-rank the NLU-ranked semantic interpretations using semantic feature confidence scoring. For example, in some embodiments, the semantic feature confidence scoring may be combined in a decision tree to re-rank the NLU-ranked semantic interpretations.

Aspects of the disclosure are directed to an automatic conversational system having multiple computer-implemented dialogue components for conducting an automated dialogue process with a human user. In some embodiments, the system may detect and/or resolve anaphora based on linguistic cues, dialogue context, and/or general knowledge. A user client may deliver dialogue output prompts to the human user and may receive dialogue input responses from the human user including speech inputs. An automatic speech recognition engine may process the speech inputs to determine corresponding sequences of representative text words. A natural language understanding (NLU) processing arrangement may process the dialogue input responses and the text words to determine corresponding semantic interpretations. In some embodiments, the NLU processing arrangement may include an anaphora processor that may be configured to access one or more information sources characterizing dialogue context, linguistic features, and/or NLU features to identify unresolved anaphora in the text words that need resolution in order to determine a semantic interpretation. A dialogue manager may manage the dialogue process with the human user based on the semantic interpretations.

In some embodiments, the anaphora processor may further resolve an identified unresolved anaphora by associating it with a previous concept occurring in the text words. For example, the anaphora processor may favor recent actions in the dialogue process, use one or more dialogue scope rules, semantic distance relations, semantic coherence relations, and/or concept default values to resolve an identified unresolved anaphora.

In some embodiments, the system may utilize a client-server architecture, for example, where the user client resides on a mobile device.

In accordance with one or more embodiments, multiple NLU interpretation selection models may be generated. The NLU interpretation selection models may include a generic NLU interpretation selection model that is not specialized for a specific set of NLU interpretations type (e.g., a name/meaning pair type), a specialized NLU interpretation selection model specific to a first set of NLU interpretations type, and a specialized NLU interpretation selection model specific to a second set of NLU interpretations type. The second set of NLU interpretations type may be different from the first set of NLU interpretations type. The specialized NLU interpretation selection model specific to the first set of NLU interpretations type may be utilized to process natural language input data comprising data corresponding to the first set of NLU interpretations type, and the specialized NLU interpretation selection model specific to the second set of NLU interpretations type may be utilized to process natural language input data comprising data corresponding to the second set of NLU interpretations type. The generic NLU interpretation selection model may be utilized to process natural language input data comprising data corresponding to neither the first set of NLU interpretations type nor the second set of NLU interpretations type.

In some embodiments, the term N-best of potential semantic interpretations type may be used. Additionally or alternatively, the type(s) used might not correspond directly to the N-Best but may instead correspond to the input utilized by the semantic re-ranking model. In some embodiments, the whole N-Best may be used as input. In some embodiments, the N interpretation may score the N-Best one-by-one. Additionally or alternatively, the re-ranker model may work on pairs of interpretations taken from the N-Best. One common type for semantic interpretations is the value of a semantic slot used to identify the action to be taken by the application. In some embodiments, this common scheme may be enriched by grouping some values with one or more common characteristics together. In some embodiments, this common scheme may be enriched with information about the other semantic slots of the interpretations (e.g., those that do not control action taken by the application).

In some embodiments, a plurality of sets of NLU interpretations types may be extracted from a dataset comprising natural language input data. Each set of NLU interpretations type of the plurality of sets of NLU interpretations types may be classified as corresponding to a set of NLU interpretations type. A group of sets of NLU interpretations type classified as corresponding to the first set of NLU interpretations type may be identified from amongst the plurality of sets of NLU interpretations types, a group of sets of NLU interpretations types classified as corresponding to the second set of NLU interpretations type may be identified from amongst the plurality of sets of NLU interpretations types, and multiple groups of sets of NLU interpretations types classified as corresponding to sets of NLU interpretations types different from both the first set of NLU interpretations type and the second set of NLU interpretations type may be identified from amongst the plurality of sets of NLU interpretations types.

In some embodiments, a determination to generate the specialized NLU interpretation selection model specific to the first set of NLU interpretations type may be made based on a number of sets of NLU interpretations types classified as corresponding to the first set of NLU interpretations type. Similarly, a determination to generate the specialized NLU interpretation selection model specific to the second set of NLU interpretations type may be made based on a number of sets of NLU interpretations types classified as corresponding to the second set of NLU interpretations type. Responsive to determining to generate the specialized NLU interpretation selection model specific to the set of NLU interpretations type, the specialized NLU interpretation selection model specific to the set of NLU interpretations type may be generated by executing a machine learning algorithm on a dataset comprising natural language input data that includes the group of sets of NLU interpretations types classified as corresponding to the first set of NLU interpretations type, does not include the group of sets of NLU interpretations types classified as corresponding to the second set of NLU interpretations type, and does not include the multiple groups of sets of NLU interpretations types classified as corresponding to sets of NLU interpretations types different from both the first set of NLU interpretations type and the second set of NLU interpretations type. Similarly, responsive to determining to generate the specialized NLU interpretation selection model specific to the second set of NLU interpretations type, the specialized NLU interpretation selection model specific to the second set of NLU interpretations type may be generated by executing the machine learning algorithm on a dataset comprising natural language input data that includes the group of sets of NLU interpretations types classified as corresponding to the second set of NLU interpretations type, does not include the group of sets of NLU interpretations types classified as corresponding to the first set of NLU interpretations type, and does not include the multiple groups of NLU interpretations types classified as corresponding to sets of NLU interpretations types different from both the first set of NLU interpretations type and the second set of NLU interpretations type. In some embodiments, the determination to generate a specialized NLU interpretation selection model for a set of NLU interpretations type may be based on variability in the natural language data classified as part of the set of NLU interpretations type (e.g., a higher variability may indicate that more training data should be obtained for the type before a specialized NLU interpretation selection model is generated for the set of NLU interpretations type).

In some embodiments, for each set of NLU interpretations type of the sets of NLU interpretations types different from both the first set of NLU interpretations type and the second set of NLU interpretations type, a determination not to generate a specialized NLU interpretation selection model specific to the set of NLU interpretations type may be made based on a number of sets of NLU interpretations types classified as corresponding to the set of NLU interpretations type. For each set of NLU interpretations type of the typesets of NLU interpretations types different from both the first set of NLU interpretations type and the second set of NLU interpretations type, responsive to determining not to generate the specialized NLU interpretation selection model specific to the set of NLU interpretations type, each NLU interpretations type corresponding to the set of NLU interpretations type may be added to a common dataset to form a dataset comprising natural language input data that includes the multiple groups of sets of NLU interpretations types classified as corresponding to sets of NLU interpretations types different from both the first set of NLU interpretations type and the second set of NLU interpretations type, does not include the group of sets of NLU interpretations types classified as corresponding to the first set of NLU interpretations type, and does not include the group of sets of NLU interpretations types classified as corresponding to the second set of NLU interpretations type. The generic NLU interpretation selection model that is not specialized for a specific set of NLU interpretations type may be generated by executing a machine learning algorithm on the dataset comprising natural language input data that includes the multiple groups of sets of NLU interpretations types classified as corresponding to sets of NLU interpretations types different from both the first set of NLU interpretations type and the second set of NLU interpretations type, does not include the group of sets of NLU interpretations types classified as corresponding to the first set of NLU interpretations type, and does not include the group of sets of NLU interpretations types classified as corresponding to the second set of NLU interpretations type.

In some embodiments, the natural language input data comprising data corresponding to the first set of NLU interpretations type may be parsed to identify the data corresponding to the first set of NLU interpretations type. Similarly, the natural language input data comprising data corresponding to the second set of NLU interpretations type may be parsed to identify the data corresponding to the second set of NLU interpretations type. Responsive to identifying the data corresponding to the first set of NLU interpretations type, the specialized NLU interpretation selection model specific to the first set of NLU interpretations type may be identified for utilization to process the natural language input data comprising the data corresponding to the first set of NLU interpretations type. Similarly, responsive to identifying the data corresponding to the second set of NLU interpretations type, the specialized NLU interpretation selection model specific to the second set of NLU interpretations type may be identified for utilization to process the natural language input data comprising the data corresponding to the second set of NLU interpretations type.

In some embodiments, the natural language input data comprising data corresponding to neither the first set of NLU interpretations type nor the second set of NLU interpretations type may be parsed to identify the data corresponding to neither the first set of NLU interpretations type nor the second set of NLU interpretations type. Responsive to identifying the data corresponding to neither the first set of NLU interpretations type nor the second set of NLU interpretations type, the generic NLU interpretation selection model may be identified for utilization to process the natural language input data comprising data corresponding to neither the first set of NLU interpretations type nor the second set of NLU interpretations type.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Dialogue Context Sharing

In traditional conversational dialog applications, all of the components function in a context-less mode: each user input is recognized and understood in isolation, and deciding what the next step should be is done by taking into account only the current state of a given component and the last user input. But human reasoning and natural language understanding rely heavily on using dialogue context information such as conversation history, visual cues, user profile, world knowledge, etc. In accordance with aspects of the disclosure, a conversational dialogue arrangement is provided, which allows the various system components to keep track of dialogue context and share such information with other system components.

Figure 1:
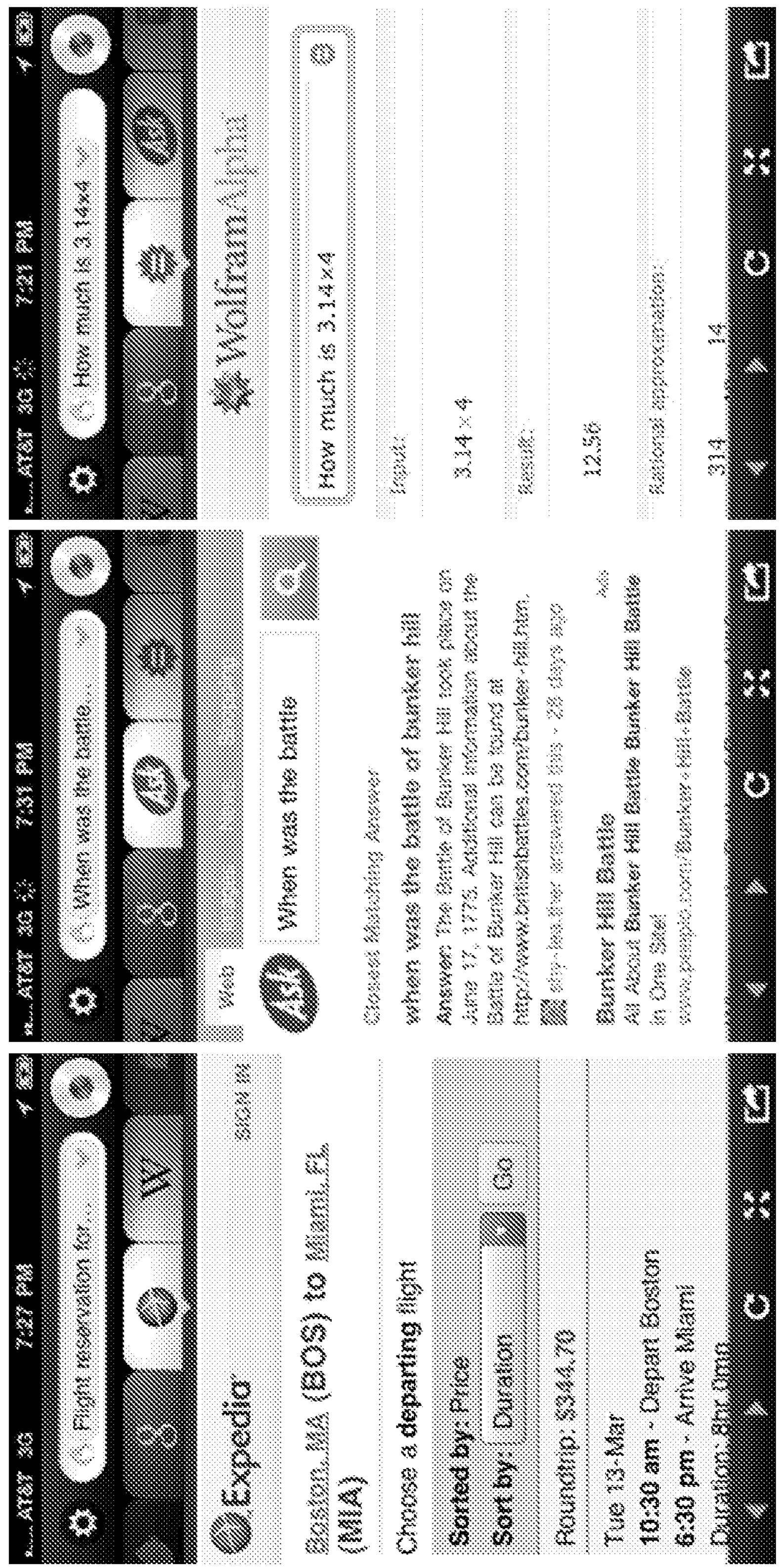
FIG. 1 depicts example screen shots of a conversational dialog application for a mobile device.
Figure 2:
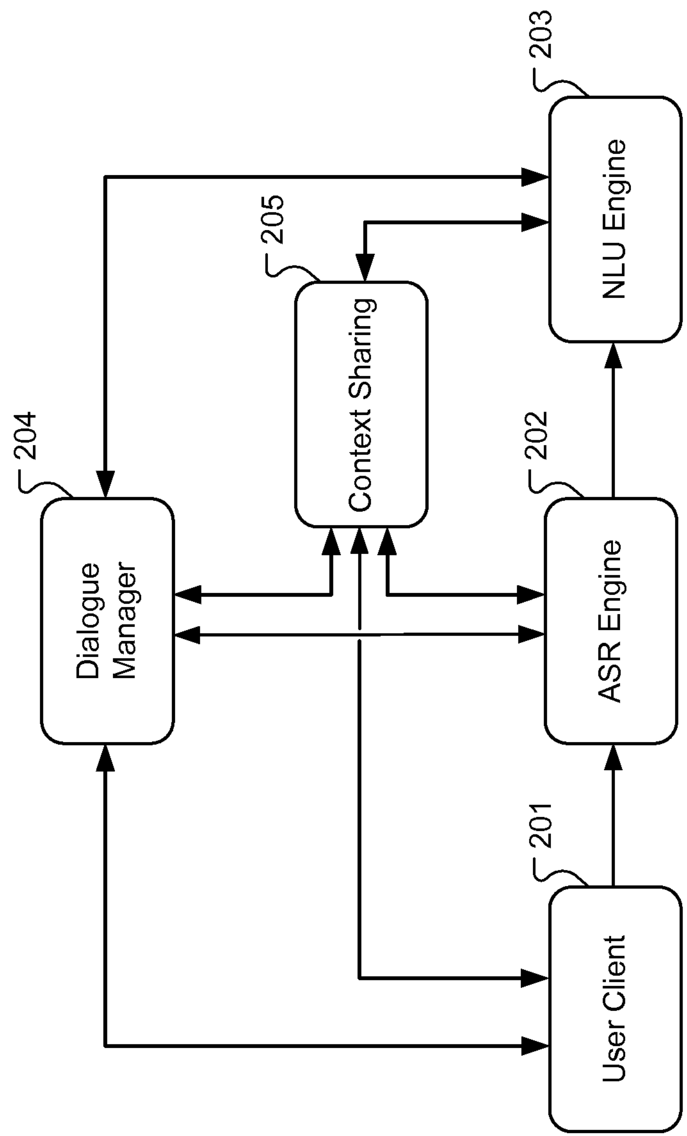
FIG. 2 depicts an example multi-modal conversational dialog application arrangement that shares context information between components in accordance with one or more example embodiments.
Figure 3:
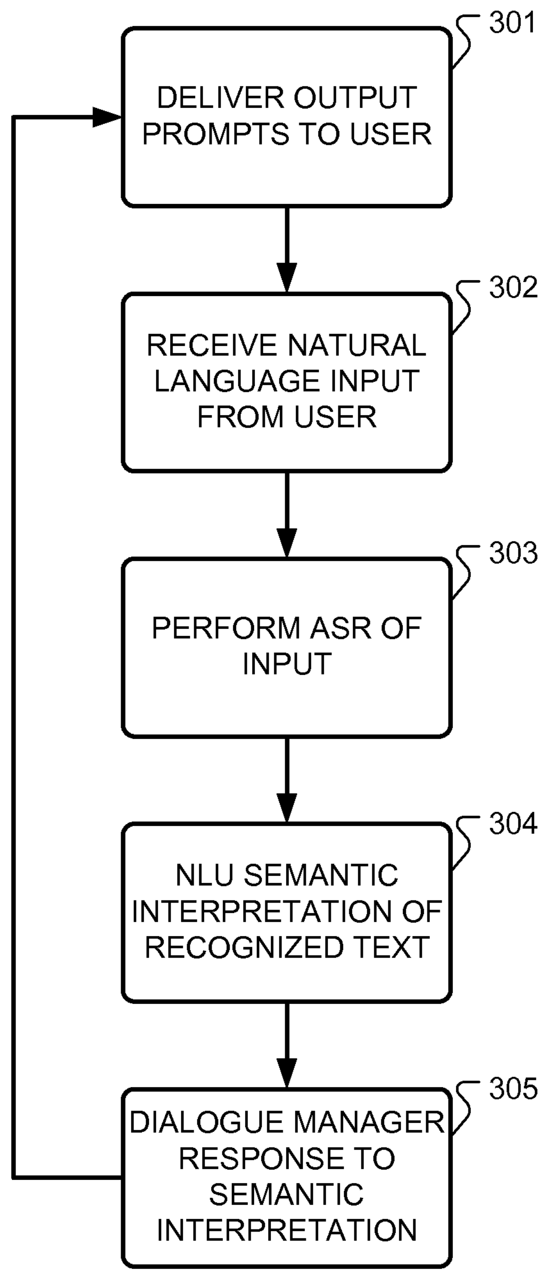
FIG. 3 depicts an illustrative method, including various example functional steps performed by a context-sharing conversational dialog application, in accordance with one or more example embodiments.

FIG. 2 depicts an example multi-modal conversational dialog application arrangement that shares context information between components in accordance with one or more example embodiments, and FIG. 3 depicts an illustrative method, including various example functional steps performed by a context-sharing conversational dialog application, in accordance with one or more example embodiments. A user client 201 may deliver output prompts to a human user, step 301, and may receive natural language dialogue inputs, including speech inputs, from the human user, step 302. An automatic speech recognition (ASR) engine 202 may process the speech inputs to determine corresponding sequences of representative text words, step 303. A natural language understanding (NLU) engine 203 may process the text words to determine corresponding semantic interpretations, step 304. A dialogue manager (DM) 204 may generate the output prompts and respond to the semantic interpretations so as to manage a dialogue process with the human user, step 305. Context sharing module 205 may provide a common context sharing mechanism so that each of the dialogue components—user client 201, ASR engine 202, NLU engine 203, and dialogue manager 204—may share context information with each other so that the operation of each dialogue component reflects available context information.

For example, the context sharing module 205 may manage dialogue context information of the dialogue manager 204 based on maintaining a dialogue belief state that represents the collective knowledge accumulated from the user input throughout the dialogue. An expectation agenda may represent what new pieces of information the dialogue manager 204 still expects to collect at any given point in the dialogue process. The dialogue focus may represent what specific information the dialogue manager 204 just explicitly requested from the user, and similarly the dialogue manager 204 may also track the currently selected items, which typically may be candidate values among which the user needs to choose for disambiguation, for selecting a given specific option (one itinerary, one reservation hour, etc.), and for choosing one of multiple possible next actions ("book now", "modify reservation", "cancel", etc.).

Based on such an approach, a dialogue context protocol may be defined, for example, as:

BELIEF=list of pairs of concepts (key, values) collected throughout the dialogue where the key is a name that identifies a specific kind of concept and the values are the corresponding concept values. For example "I want to book a meeting on May first" would yield a BELIEF={(DATE, "2012 May 1"), (INTENTION="new_meeting")}.

FOCUS=the concept key. For example, following a question of the system "What time would you like the meeting at?", the focus may be START_TIME.

EXPECTATION=list of concept keys the system may expect to receive. For instance, in the example above, while FOCUS is START_TIME, EXPECTATION may contain DURATION, END_TIME, PARTICIPANTS, LOCATION, . . . .

SELECTED_ITEMS: a list of key-value pairs of currently selected concept candidates among which the user needs to pick. Thus a dialogue prompt: "do you mean Debbie Sanders or Debbie Xanders?" would yield to SELECTED_ITEMS {(CONTACT, Debbie Sanders), (CONTACT, Debbie Xanders)}.

Communicating this dialogue context information back to the NLU engine 203 may enable the NLU engine 203 to weight focus and expectation concepts more heavily. And communicating such dialogue context information back to the ASR engine 202 may allow for smart dynamic optimization of the recognition vocabulary, and communicating the dialogue context information back to the user client 201 may help determine part of the current visual display on that device.

Similarly, the context sharing module 205 may also manage visual/client context information of the user client 201. One specific example of visual context would be when the user looks at a specific day of her calendar application on the visual display of the user client 201 and says: "Book a meeting at 1 pm," she probably means to book it for the date currently in view in the calendar application.

The user client 201 may also communicate touch input information via the context sharing module 205 to the dialogue manager 204 by sending the semantic interpretations corresponding to the equivalent natural language command. For instance, clicking on a link to "Book now" may translate into INTENTION:confirmBooking. In addition, the user client 201 may send contextual information by prefixing each such semantic key-value input pairs by the keyword CONTEXT. In that case, the dialogue manager 204 may treat this information as "contextual" and may consider it for default values, but not as explicit user input.

The context sharing module 205 may also manage NLU/general knowledge context with regards to the NLU engine 203. For example, when a person says: "Book a flight to London," it may be safe to assume that the destination is not London, Ontario, that the user most probably means London, UK. Moreover, depending on the user's current location and/or other information in a user profile, it might even be reasonable to propose what specific London airport is most likely. The NLU engine 203 may access knowledge databases and return contextual information about concepts that have not been explicitly mentioned in the user's current sentence, and may communicate context by defining complex hierarchical concepts and concept properties (or attributes) associated to a concept.

Semantic Re-Ranking

Conventional ASR and NLU engines process natural language user inputs in isolation, one input at a time. Each engine typically produces a set of output candidates. Each ASR candidate can have multiple semantic interpretations—language is ambiguous and a given sequence of words can mean many different things. A semantic interpretation can be thought of as a set of (possibly hierarchical) semantic slots, each corresponding to a concept in the natural language input. The ASR recognition candidates are ranked in terms of acoustic and language model match. In the special case of a natural language input from the user in the form of text from a keyboard, the ASR engine can be bypassed, which is equivalent to a 1-best high accuracy ASR output. The ASR and NLU semantic interpretations typically are ranked by various heuristics ranging from parsing accuracy to semantic model probabilities.

But both the ASR engine and the NLU engine have no notion of conversation history. Their combined semantic interpretation candidates are ranked based on local features only. However, sometimes, knowing what question was asked in the dialogue process (the focus), what information is already known (the belief state), and what other pieces of information can be still expected from the user (the expectation agenda) can influence the likelihood of one interpretation candidate over another. Moreover, having some notion of world knowledge may help make a better informed decision of which of the interpretation candidates is actually correct; for example, knowing that the scheduling of a 13 minute meeting is much less probable than the scheduling of a 30 minute meeting.

This suggests that it would be useful to perform a re-ranking of the N-best semantic interpretations using dialogue context and world knowledge to order all likely interpretations of an utterance by their adequacy in representing the user intent. Thus, in accordance with aspects of the disclosure, a human-machine dialogue arrangement with multiple computer-implemented dialogue components that performs a semantic re-ranking of NLU results in conversational applications using dialogue context and world knowledge is provided.

Figure 4:
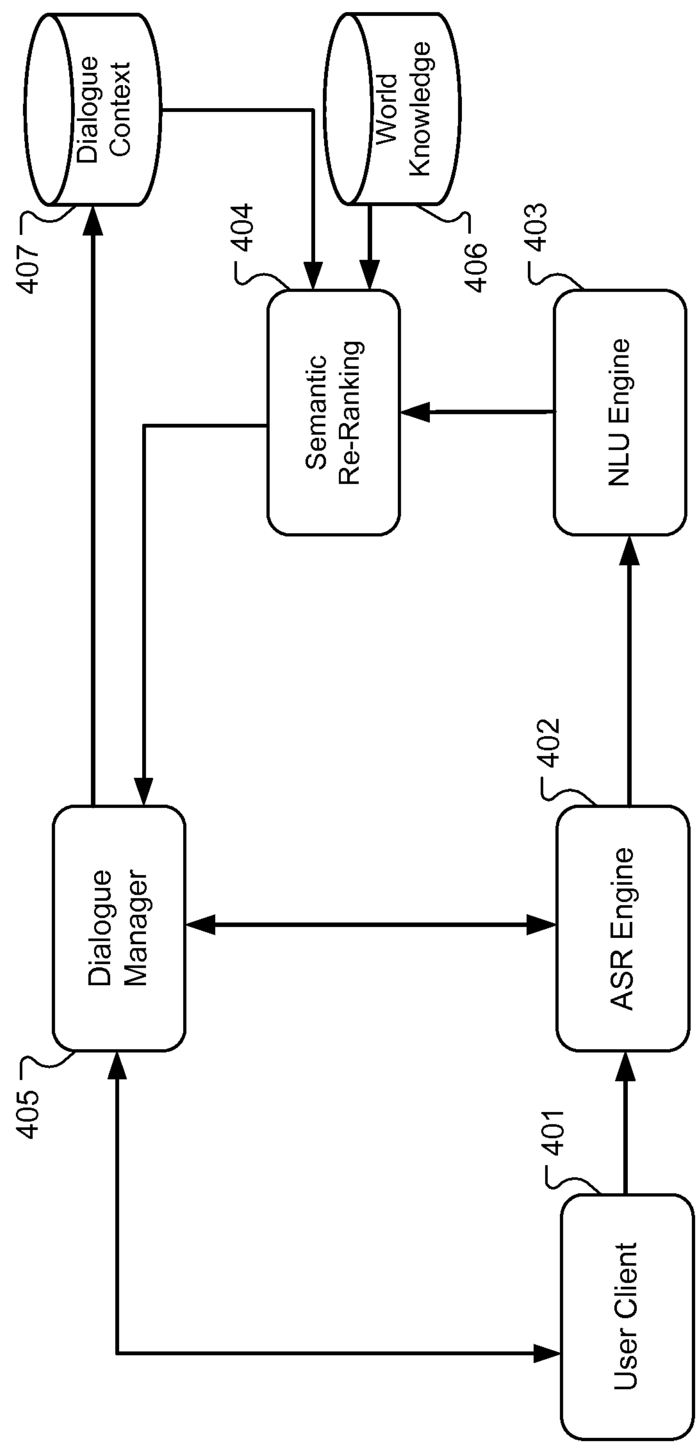
FIG. 4 depicts an example of an automated conversational dialogue system for performing a semantic re-ranking of NLU results using dialogue context and world knowledge in accordance with one or more example embodiments.
Figure 5:
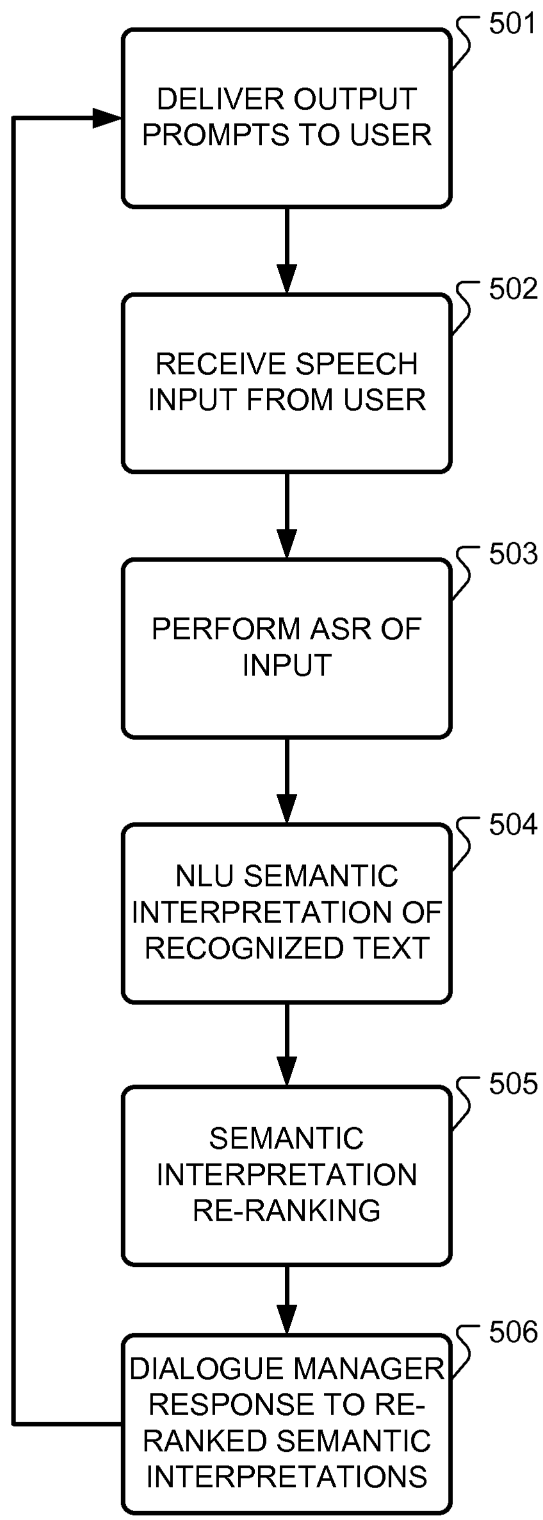
FIG. 5 depicts an illustrative method, including various example functional steps performed by an automated conversational dialog application performing a semantic re-ranking of NLU results using dialogue context and world knowledge, in accordance with one or more example embodiments.

FIG. 4 depicts an example of an automated conversational dialogue system for performing a semantic re-ranking of NLU results using dialogue context and world knowledge in accordance with one or more example embodiments, and FIG. 5 depicts an illustrative method, including various example functional steps performed by an automated conversational dialog application performing a semantic re-ranking of NLU results using dialogue context and world knowledge, in accordance with one or more example embodiments. A user client 401 may deliver output prompts to a human user, step 501, and may receive dialogue inputs from the human user, including speech inputs, step 502. An automatic speech recognition (ASR) engine 402 may process the speech inputs to determine corresponding sequences of representative text words, step 503. A natural language understanding (NLU) engine 403 may process the text words to determine corresponding NLU-ranked semantic interpretations, step 504. A semantic re-ranking module 404 may re-rank the NLU-ranked semantic interpretations based on at least one of dialogue context information 407 and world knowledge information 408, step 505. A dialogue manager 405 may respond to the re-ranked semantic interpretations and may generate the output prompts so as to manage a dialogue process with the human user, step 506.

The semantic re-ranking module 404 may re-rank the N-best NLU-ranked semantic interpretations. Dialogue context information 407 may be characterized by a context sharing mechanism using key value pairs including a key element characterizing a specific context type and a value element characterizing a specific context value, thereby reflecting context of the NLU engine within the dialogue process. In some embodiments, the dialogue context information 407 may include one or more of:

- a belief state reflecting collective knowledge accumulated during the dialogue process,
- an expectation agenda reflecting new information expected by the dialogue manager 405,
- a dialogue focus, reflecting information most recently prompted by the dialogue manager 405, and
- one or more selected items reflecting user dialogue choices needed by the dialogue manager 405.

Conventional approaches to semantic re-ranking are based on a pipeline of ad hoc rules. The tuning of those rules for specific applications can be very difficult since the impacts of modifying a rule are difficult to predict and some rules seem more adapted to a given application than to another. Thus, in some embodiments, semantic re-ranking module 404 may use a machine learning approach to learn a statistical re-ranking model on annotated examples with the semantic slots that a 1-best output should contain. A default re-ranking model may be included with the semantic re-ranking module 404 but an application developer may also produce a custom or adapted model using an offline training tool. The application developer may also define rules that would have precedence on the statistical re-ranking model to fix specific cases.

In some embodiments, for each semantic interpretation returned by the NLU engine, a set of robust, application independent and language independent confidence features may be computed, including, for example:

- Internalization status: Categorizing the relevancy of the semantic interpretation to the application domain. Interpretations that are out of vocabulary or not matching may be filtered.
- Parsing confidence: Confidence of the NLU in the interpretation parsing.
- Focus weight: Categorizing the interpretation on how well it fits the expectation of the application.
- Parsed word ratio: The ratio of words attributed to a semantic slot in the utterance.
- Slot internalization ratio: The ratio of slots relevant to the dialog application in the current context.
- Internalized word ratio: The ratio of words attributed to a semantic slot relevant to the dialog application in the current context.

Raw Score: Score attributed to the ASR result on which the interpretation is based.

ASR index: Position of the ASR result on which the interpretation is based in the list of all ASR results Slot in focus count: Number of slots in the interpretation that are expected by the dialog application.

Parsing score: Score attributed by the NLU ranker to the interpretation.

Average prior: Average of the semantic slot prior value.

Correction Score: Ratio of corrected slots.

Correction slot count: Number of slots that have been corrected.

Slot count: The number of slots in the interpretation

Ratio of slots in focus: Ratio of slots expected by the application.

RAW score cluster: Cluster raw score in groups (e.g., 5 groups) based on their normalized value.

Average interpretation similarity: The average similarity of the interpretation to other interpretations of the N-best list. The similarity between two different interpretations may be measured by the F1-score. A good interpretation tends to be generated several times with some variation.

These features can characterized by a multi-dimensional feature vector to which a polynomial transformation may be applied to produce a prediction target that reflects the adequacy of a given semantic interpretation based on its similarity to the annotation measured by the F1-score of their respective list of associated semantic slots.

Once the confidence feature criteria are included for each semantic interpretation, two types of re-ranking decisions may be implemented: confidence score computation and heuristic weighting. Heuristic weighting may be based on a neural net model that computes feature weights and processes a weighted sum of the features. Confidence score features may be combined in a decision tree and a new ranking may obtained of the semantic interpretations (e.g., with the most likely one ranked first). Specifically, parsing of the decision tree in effect answers in a series of questions about the confidence features that are used to compute a confidence-based re-ranking score. At each node in the decision tree, a question about one feature or one combination of features may be answered to produce a new semantic ranking score for the complete sentence. The re-ranked semantic interpretations may then be returned to the dialogue manager.

Anaphora Resolution

A dialogue reference to a previously discussed concept is called an anaphora, and a sentence containing such references is called anaphoric. The mechanisms by which such references are solved are referred to as anaphora resolution. For example, suppose a person is placing an order for pizza delivery, and at some points says "make it extra-large." One could assume that it refers to the pizza size. Yet it could also be the size of a drink and only the conversational context can help resolve this ambiguity. If the customer had said "make it all dressed," one would use the common world knowledge, knowing that only pizzas have the property of being all-dressed, to deduce that the sentence refers to pizza.

In accordance with aspects of the disclosure, a generic application-independent algorithm is provided that allows automated conversational dialogue applications to detect and resolve anaphora based on linguistic cues, dialogue context, and/or general knowledge.

Figure 6:
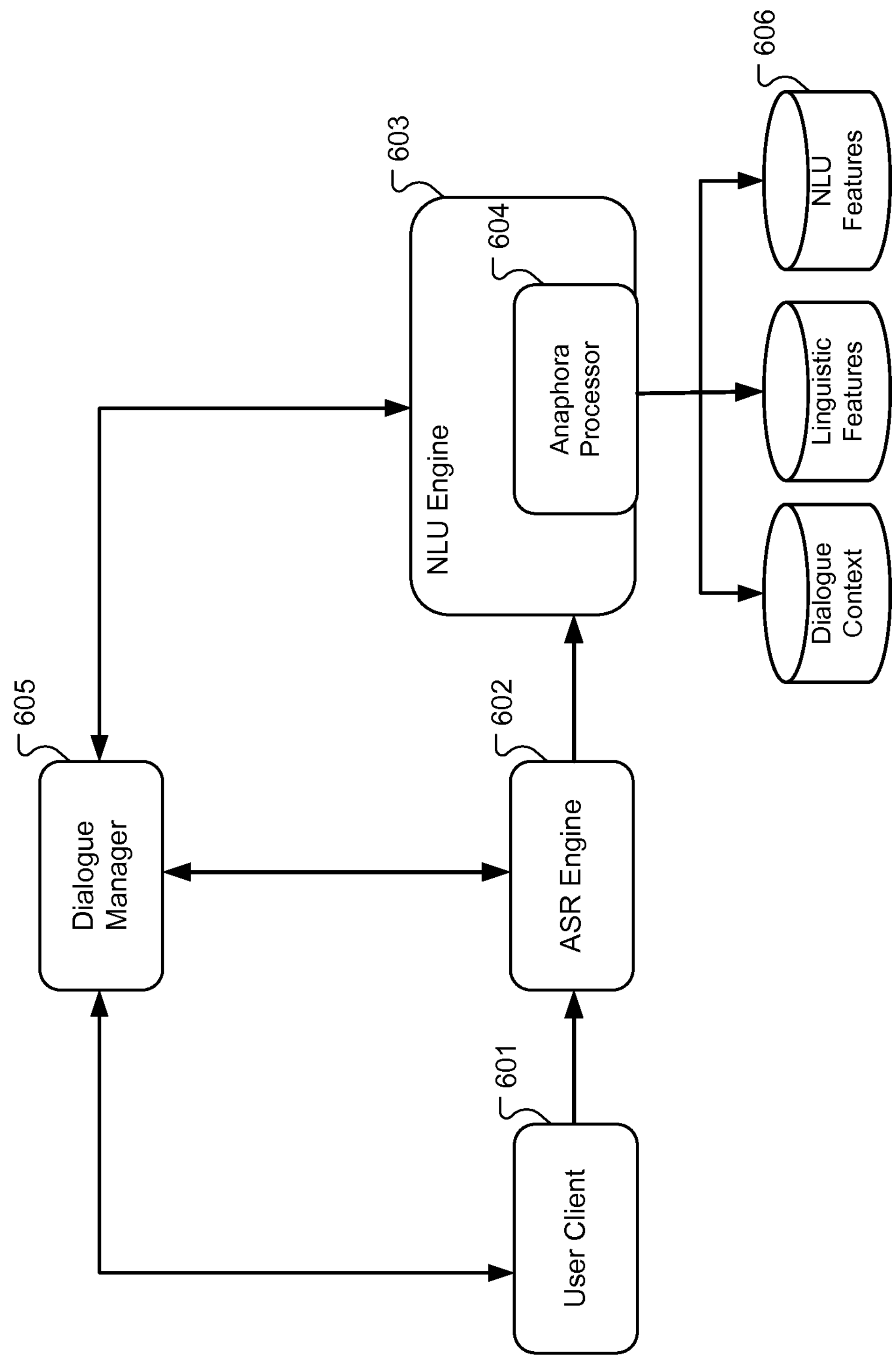
FIG. 6 depicts an example of an automated conversational dialogue system for identifying and resolving anaphora in accordance with one or more example embodiments.
Figure 7:
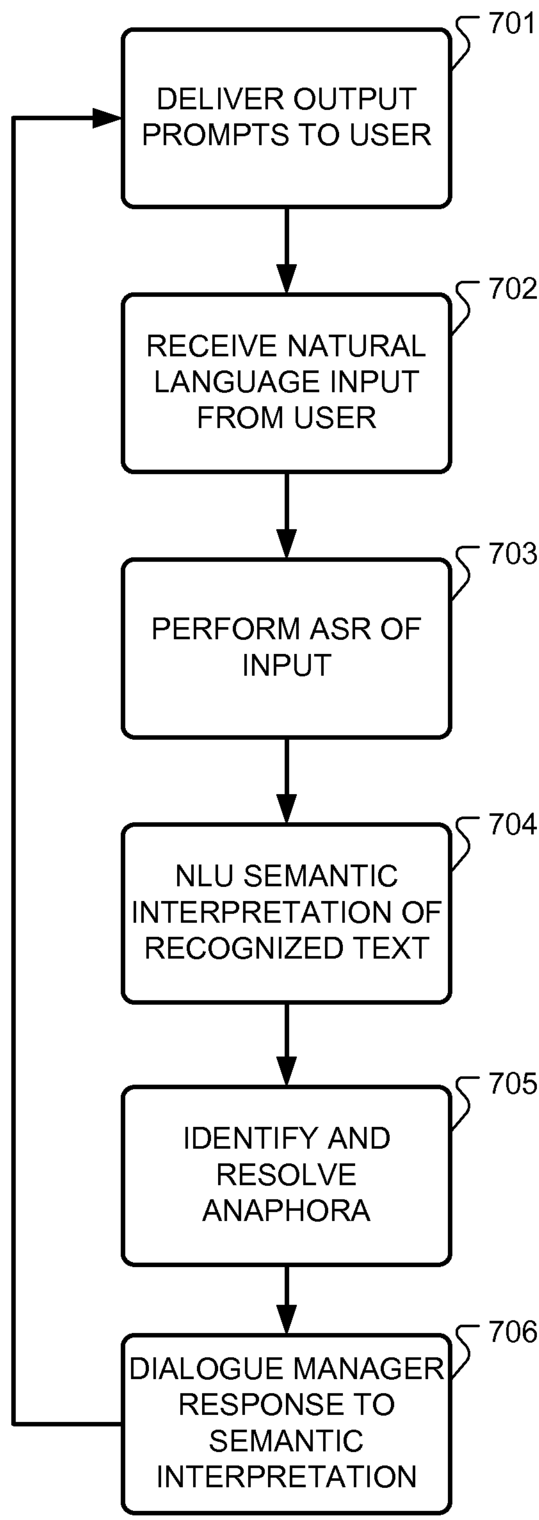
FIG. 7 depicts an illustrative method, including various example functional steps performed by an automated conversational dialog application identifying and resolving anaphora, in accordance with one or more example embodiments.

FIG. 6 depicts an example of an automated conversational dialogue system for identifying and resolving anaphora in accordance with one or more example embodiments, and FIG. 7 depicts an illustrative method, including various example functional steps performed by an automated conversational dialog application identifying and resolving anaphora, in accordance with one or more example embodiments. A user client 601 may deliver output prompts to a human user, step 701, and may receive natural language dialogue inputs, including speech inputs from the human user, step 702. An automatic speech recognition (ASR) engine 602 may process the speech inputs to determine corresponding sequences of representative text words, step 703. A natural language understanding (NLU) engine 603 may process the text words to determine corresponding semantic interpretations, step 704. The NLU engine 603 may include an anaphora processor 604 that may access different information sources 606 characterizing dialogue context, linguistic features, and NLU features to identify and resolve anaphora in the text words needing resolution, step 705, in order to determine a semantic interpretation. A dialogue manager (DM) 605 may generate the output prompts and may respond to the semantic interpretations so as to manage a dialogue process with the human user, step 706.

Among the different information sources 606 accessed by the anaphora processor 604 to flag zero or more concepts as anaphoric are NLU features that reflect when the anaphora processor 604 learns that certain wordings project to concepts (slots) being carried over from context. For example, when a sentence starts with "how about . . . ", the previous user intent will apply to the current query, and so the anaphora processor 604 may generate an INTENTION="context" concept. If a sentence contains a personal pronoun ("call her"), the person is somebody mentioned in the past conversation history and the anaphora processor 604 may generate a PERSON="context" concept. So, whenever the output of the NLU engine 603 contains concepts whose value is "context," this may be a reliable indication that the particular concept needs to be mapped by the anaphora processor 604 to a mention earlier in the conversation. The NLU predictions are meant to be more generic: "her" might refer to a MEETING_PARTICIPANT, yet the anaphora processor 604 may map it to PERSON: context. "It" could mean anything and the anaphora processor 604 may map that to CONCEPT:context.

The information sources 606 that the anaphora processor 604 accesses may also include dialogue context data. Elliptic input queries may be detected when slots that are mandatory at a given point in the dialogue are missing. For example, if the recognized sentence lacks a slot for INTENTION but there are other action parameters (date, time, person, etc.), that would be evidence of context carry-over. The information sources 606 may also include linguistic features such as missing verbs ("How about tomorrow?"), elliptic sentences ("not that"), presence of pronouns ("with her"), presence of definite articles ("the pizza").

Any anaphora identified by the anaphora processor 604 may also need to be resolved. The dialogue manager 605 may keep track of the dialogue history, record each step in the dialogue (user input, system prompt) along with the set of current selected items (or search results) at each step and the current belief state (the collected values that define the query). At each new user input, the anaphora processor 604 may iterate through the dialogue history, starting from the previous user query and working back towards further back interactions, and may compute a correlation measure optimized over data examples. The anaphora processor 604 may base this correlation measure on various features such as:

Dialogue history. For example, how far back in the conversation history are the "missing" concept slots being found?

Dialogue scope/task configuration. Independent stand-alone tasks may be configured as boundaries for context carry-over. For example, given an application that can schedule meetings, make restaurant reservations, place calls, send emails, etc., some of these tasks may be marked as "incompatible" so that no carry over is allowed.

Semantic/ontology distance. Typically there may be a hierarchy of "is a" relations in a given ontology (a MEETING_PARTICIPANT is a PERSON). When the NLU engine 603 outputs a context slot, the anaphora processor 604 may look in the dialogue history for any concept of the same type, or of a more general type, linked through a "is a" relation.

Semantic/ontology coherence. The system may represent "has a" relations in the ontology ("PIZZA has a SIZE and PIZZA has a TOPPINGS_TYPE). In each anaphoric sentence, the anaphora processor 604 may replace the context concept with its resolution candidate and may compute how "semantically compatible" the sentence is (e.g., a sentence "make the pizza all dressed" may have a higher semantic coherence than "make the drink all dressed").

Default values. Sometimes the anaphora processor 604 may resolve missing concepts not from the dialogue history, but from default values. Deciding when a concept has a default value and when it is probable enough or more probable than a matching value may be computed by the anaphora processor 604 as a combination of all of the above measures.

When the resolution probability is high enough (e.g., above a configurable threshold), the anaphora processor 604 may accept the resolution.

Specialized NLU Interpretation Selection Models

As indicated above, conventional approaches to semantic re-ranking are based on a pipeline of ad hoc rules, which may be referred to as an NLU interpretation model. The tuning of such a model for specific applications can be very difficult since the impacts of modifying a rule are difficult to predict and some rules seem more adapted to a given application than to another. Additionally, if a model is tuned based on a dataset that includes a disproportionate amount of data related to a specific application, the model can become biased to the application, which may result in poor performance when interpreting data that is unrelated to the application.

As indicated above, a dialogue context protocol may be defined to include one or more sets of NLU interpretations types (e.g., a BELIEF that comprises one or more name/meaning or name/value pairs). In accordance with one or more embodiments, multiple NLU interpretation selection models may be generated. The NLU interpretation selection models may include a generic NLU interpretation selection model that is not specialized for a specific set of NLU interpretations type and one or more specialized NLU interpretation selection models, each of which may be specific to a particular set of NLU interpretations type. The specialized NLU interpretation selection model(s) may be utilized to process natural language input data comprising data corresponding to their respective sets of NLU interpretations type(s). The generic NLU interpretation selection model may be utilized to process natural language input data comprising data that does not correspond to the sets of NLU interpretations type(s) associated with the specialized NLU interpretation selection model(s).

Figure 8:
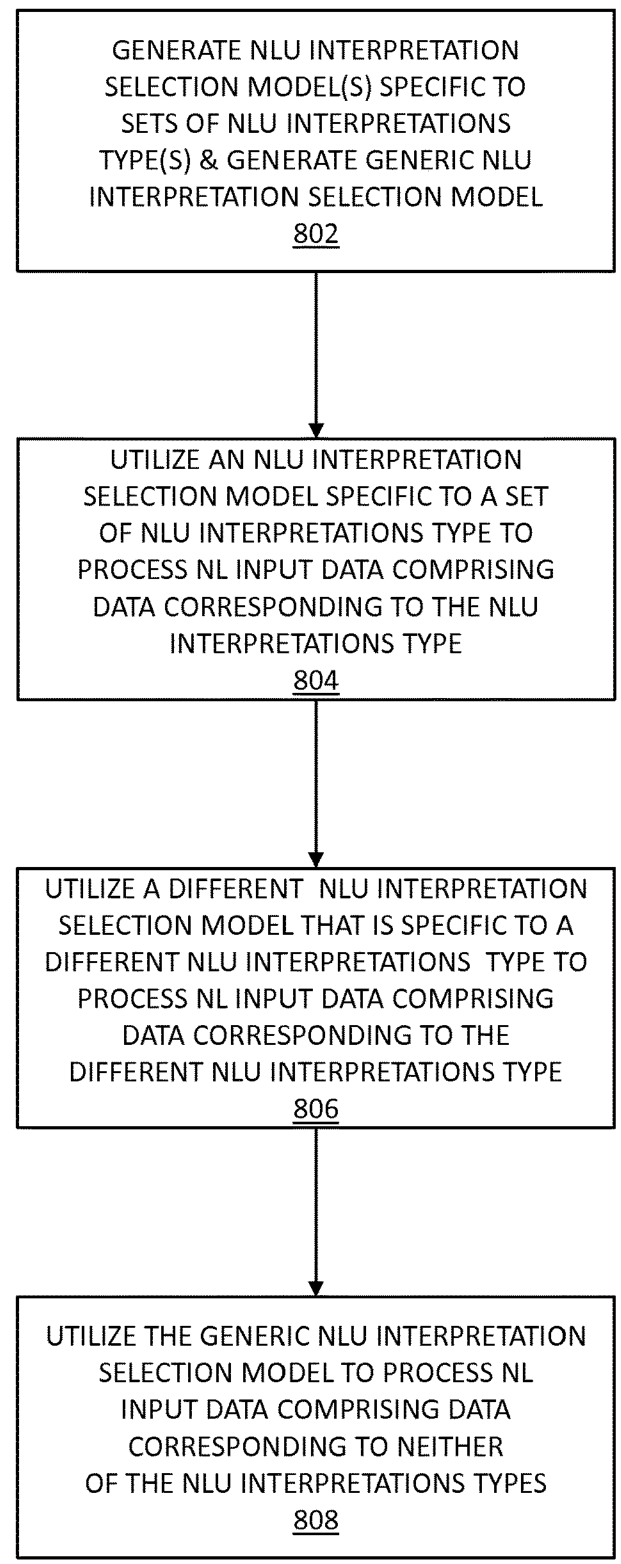
FIG. 8 depicts an illustrative method for generating and utilizing NLU interpretation selection models in accordance with one or more example embodiments.

FIG. 8 depicts an illustrative method for generating and utilizing NLU interpretation selection models in accordance with one or more example embodiments. Referring to FIG. 8, at step 802, multiple NLU interpretation selection models may be generated. For example, as will be described in greater detail below, a plurality of sets of NLU interpretations types may be identified within a dataset comprising natural language input data (e.g., training, validation, and/or test data). A determination may be made (e.g., based on a number of sets of NLU interpretations types in the dataset that correspond to a given set of NLU interpretations type) to generate one or more specialized NLU interpretation selection models, each of which may be specific to a particular set of NLU interpretations type. For example, a specialized NLU interpretation selection model specific to a first set of NLU interpretations type may be generated, and a specialized NLU interpretation selection model specific to a second set of NLU interpretations type may also be generated. The second set of NLU interpretations type may be different from the first set of NLU interpretations type. A generic NLU interpretation selection model that is not specialized for a specific set of NLU interpretations type may also be generated, for example, based on sets of NLU interpretations types in the dataset that correspond to neither the first set of NLU interpretations type nor the second set of NLU interpretations type (e.g., sets of NLU interpretations types with a lower number of occurrences in the dataset than the number of occurrences of sets of NLU interpretations types in the dataset that correspond to the first set of NLU interpretations type and/or the number of occurrences of sets of NLU interpretations types in the dataset that correspond to the second set of NLU interpretations type).

At step 804, the specialized NLU interpretation selection model specific to the first set of NLU interpretations type may be utilized to process natural language input data comprising data corresponding to the first set of NLU interpretations type. For example, as will be described in greater detail below, natural language input data may be parsed to identify sets of NLU interpretations types within the data, each of which may be categorized as corresponding to a set of NLU interpretations type. The specialized NLU interpretation selection model specific to the first set of NLU interpretations type may be utilized to process a portion of the natural language input data comprising sets of NLU interpretations types that correspond to the first set of NLU interpretations type. Similarly, at step 806, the specialized NLU interpretation selection model specific to the second set of NLU interpretations type may be utilized to process natural language input data comprising data corresponding to the second set of NLU interpretations type. For example, as described with respect to step 804, natural language input data may be parsed to identify sets of NLU interpretations types within the data, each of which may be categorized as corresponding to a set of NLU interpretations type. The specialized NLU interpretation selection model specific to the second set of NLU interpretations type may be utilized to process a portion of the natural language input data comprising sets of NLU interpretations types that correspond to the second set of NLU interpretations type. At step 808, the generic NLU interpretation selection model may be utilized to process natural language input data comprising data corresponding to neither the first set of NLU interpretations type nor the second set of NLU interpretations type. For example, the generic NLU interpretation selection model may be utilized to process portions of the natural language input data that comprise data including sets of NLU interpretations types categorized as corresponding to neither the first set of NLU interpretations type nor the second set of NLU interpretations type.

Figure 9:
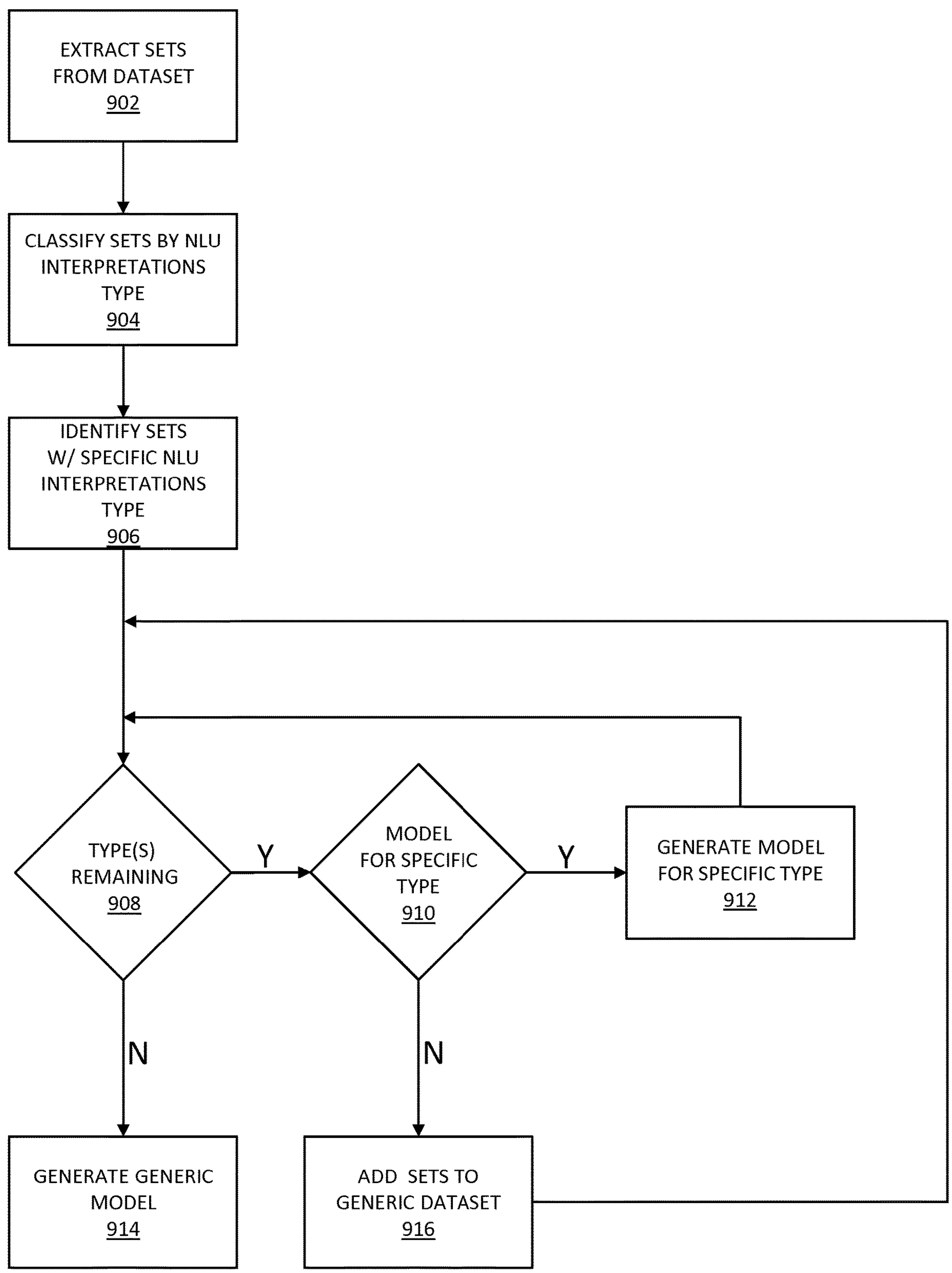
FIG. 9 depicts an illustrative method for generating NLU interpretation selection models in accordance with one or more example embodiments.

FIG. 9 depicts an illustrative method for generating NLU interpretation selection models in accordance with one or more example embodiments. Referring to FIG. 9, at step 902, a plurality of sets of NLU interpretations types may be extracted from a dataset comprising natural language input data. For example, a plurality of sets of NLU interpretations types may be extracted from a dataset comprising natural language input data (e.g., training, validation, and/or test data). At step 904, each set of NLU interpretations types of the plurality of sets of NLU interpretations types may be classified as corresponding to a set of NLU interpretations type (e.g., based on a possible associated application and/or interpretation). For example, a group of sets of NLU interpretations types may be classified as corresponding to a first set of NLU interpretations type, a group of sets of NLU interpretations types may be classified as corresponding to a second set of NLU interpretations type, and one or more other sets of NLU interpretations types may be classified as corresponding to one or more other sets of NLU interpretations types (e.g., sets of NLU interpretations types different from both the first set of NLU interpretations type and the second set of NLU interpretations type). At step 906, each of the groups of sets of NLU interpretations types may be identified (e.g., based on their classified sets of NLU interpretations types). For example, the group of sets of NLU interpretations types classified as corresponding to the first set of NLU interpretations type may be identified from amongst the plurality of sets of NLU interpretations types in the dataset, the group of sets of NLU interpretations types classified as corresponding to the second set of NLU interpretations type may be identified from amongst the plurality of sets of NLU interpretations types in the dataset, and multiple groups of sets of NLU interpretations types classified as corresponding to sets of NLU interpretations types different from both the first set of NLU interpretations type and the second set of NLU interpretations type may be identified from amongst the plurality of sets of NLU interpretations types in the dataset.

At step 908, a determination may be made regarding whether any groups of sets of NLU interpretations types remain to be processed. For example, a determination may be made that groups of sets of NLU interpretations types remain to be processed (e.g., the group of sets of NLU interpretations types classified as corresponding to the first set of NLU interpretations type, the group of sets of NLU interpretations types classified as corresponding to the second set of NLU interpretations type, and the multiple groups of sets of NLU interpretations types classified as corresponding to sets of NLU interpretations types different from both the first set of NLU interpretations type and the second set of NLU interpretations type). At step 910, a determination may be made whether to generate a specialized NLU interpretation selection model specific to a set of NLU interpretations type that remains to be processed. For example, a determination may be made to generate a specialized NLU interpretation selection model specific to the first set of NLU interpretations type (e.g., based on a number of sets of NLU interpretations types classified as corresponding to the first set of NLU interpretations type). At step 912, responsive to determining to generate the specialized NLU interpretation selection model specific to the first set of NLU interpretations type, the specialized NLU interpretation selection model specific to the first set of NLU interpretations type may be generated by executing a machine learning algorithm on a dataset comprising natural language input data that includes the group of sets of NLU interpretations types classified as corresponding to the first set of NLU interpretations type, does not include the group of sets of NLU interpretations types classified as corresponding to the second set of NLU interpretations type, and does not include the multiple groups of sets of NLU interpretations types classified as corresponding to sets of NLU interpretations types different from both the first set of NLU interpretations type and the second set of NLU interpretations type. The method may then return to step 908, and a determination may be made regarding whether any groups of sets of NLU interpretations types remain to be processed. For example, a determination may be made that groups of sets of NLU interpretations types remain to be processed (e.g., the group of sets of NLU interpretations types classified as corresponding to the second set of NLU interpretations type and the multiple groups of sets of NLU interpretations types classified as corresponding to sets of NLU interpretations types different from both the first set of NLU interpretations type and the second set of NLU interpretations type).

At step 910, a determination may be made whether to generate a specialized NLU interpretation selection model specific to a set of NLU interpretations type that remains to be processed. For example, a determination may be made to generate a specialized NLU interpretation selection model specific to the second set of NLU interpretations type (e.g., based on a number of sets of NLU interpretations types classified as corresponding to the second set of NLU interpretations type). At step 912, responsive to determining to generate the specialized NLU interpretation selection model specific to the second set of NLU interpretations type, the specialized NLU interpretation selection model specific to the second set of NLU interpretations type may be generated by executing a machine learning algorithm (e.g., the same machine learning algorithm or a different machine learning algorithm) on a dataset comprising natural language input data that includes the group of sets of NLU interpretations types classified as corresponding to the second set of NLU interpretations type, does not include the group of sets of NLU interpretations types classified as corresponding to the first set of NLU interpretations type, and does not include the multiple groups of set of NLU interpretations types classified as corresponding to sets of NLU interpretations types different from both the first set of NLU interpretations type and the second set of NLU interpretations type. The method may then return to step 908, and a determination may be made regarding whether any groups of sets of NLU interpretations types remain to be processed. For example, a determination may be made that groups of sets of NLU interpretations types remain to be processed (e.g., the multiple groups of sets of NLU interpretations types classified as corresponding to sets of NLU interpretations types different from both the first set of NLU interpretations type and the second set of NLU interpretations type).

At step 910, a determination may be made whether to generate a specialized NLU interpretation selection model specific to a set of NLU interpretations type that remains to be processed. For example, a determination may be made not to generate a specialized NLU interpretation selection model specific to a set of NLU interpretations type corresponding to a group of the multiple groups of sets of NLU interpretations types classified as corresponding to set of NLU interpretations types different from both the first set of NLU interpretations type and the second set of NLU interpretations type (e.g., based on a number of sets of NLU interpretations types classified as corresponding to the set of NLU interpretations type). At step 916, responsive to determining not to generate a specialized NLU interpretation selection model specific to the set of NLU interpretations type corresponding to the group of the multiple groups of sets of NLU interpretations types classified as corresponding to set of NLU interpretations types different from both the first set of NLU interpretations type and the second set of NLU interpretations type, each NLU interpretations type corresponding to the set of NLU interpretations type may be added to a common dataset to form a dataset comprising natural language input data that includes the multiple groups of sets of NLU interpretations types classified as corresponding to sets of NLU interpretations types different from both the first set of NLU interpretations type and the second set of NLU interpretations type, does not include the group of sets of NLU interpretations types classified as corresponding to the first set of NLU interpretations type, and does not include the group of sets of NLU interpretations types classified as corresponding to the second set of NLU interpretations type (e.g., a generic dataset). The method may then return to step 908, and a determination may be made regarding whether any groups of sets of NLU interpretations types remain to be processed. For example, a determination may be made that groups of sets of NLU interpretations types remain to be processed (e.g., any remaining groups of the multiple groups of sets of NLU interpretations types classified as corresponding to sets of NLU interpretations types different from both the first set of NLU interpretations type and the second set of NLU interpretations type).

Steps 910, 916, and 908 may be repeated for each group of the multiple groups of sets of NLU interpretations types classified as corresponding to sets of NLU interpretations types different from both the first set of NLU interpretations type and the second set of NLU interpretations type, until a determination is made, at step 908, that no more groups of sets of NLU interpretations types remain to be processed, at which point the method may proceed to step 914. At step 914, a generic NLU interpretation selection model that is not specialized for a specific set of NLU interpretations type may be generated by executing a machine learning algorithm (e.g., the same machine learning algorithm or a different machine learning algorithm) on the generic dataset (e.g., the dataset comprising natural language input data that includes the multiple groups of sets of NLU interpretations types classified as corresponding to sets of NLU interpretations types different from both the first set of NLU interpretations type and the second set of NLU interpretations type, does not include the group of sets of NLU interpretations types classified as corresponding to the first set of NLU interpretations type, and does not include the group of sets of NLU interpretations types classified as corresponding to the second set of NLU interpretations type).

Figure 10:
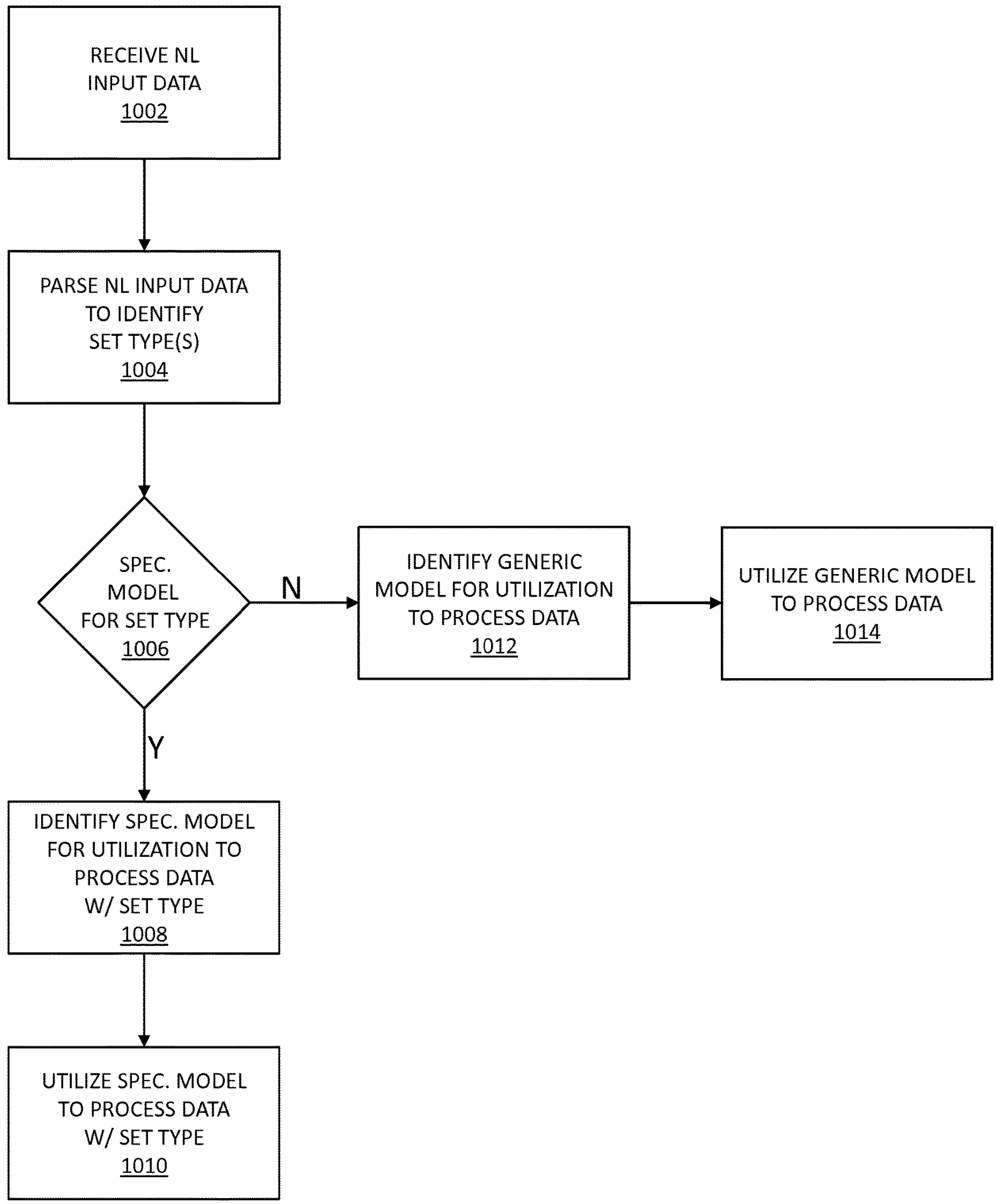
FIG. 10 depicts an illustrative method for utilizing NLU interpretation selection models in accordance with one or more example embodiments.

FIG. 10 depicts an illustrative method for utilizing NLU interpretation selection models in accordance with one or more example embodiments. Referring to FIG. 10, at step 1002, natural language input data may be received. For example, natural language input data comprising data corresponding to the first set of NLU interpretations type, data corresponding to the second set of NLU interpretations type, and data that corresponds to neither the first set of NLU interpretations type nor the second set of NLU interpretations type may be received. At step 1004, the received natural language input data may be parsed to identify sets of NLU interpretations types, each of which may be categorized as corresponding to a specific set of NLU interpretations type (e.g., the first set of NLU interpretations type, the second set of NLU interpretations type, or a set of NLU interpretations type other than the first set of NLU interpretations type and the second set of NLU interpretations type). For example, the natural language input data comprising data corresponding to the first set of NLU interpretations type, data corresponding to the second set of NLU interpretations type, and data that corresponds to neither the first set of NLU interpretations type nor the second set of NLU interpretations type may be parsed to identify sets of NLU interpretations types, each of which may be categorized as corresponding to a specific set of NLU interpretations type (e.g., sets of NLU interpretations types within the data corresponding to the first set of NLU interpretations type may be identified and categorized as corresponding to the first set of NLU interpretations type, sets of NLU interpretations types within the data corresponding to the second set of NLU interpretations type may be identified and categorized as corresponding to the second set of NLU interpretations type, and sets of NLU interpretations types within the data that corresponds to the neither the first set of NLU interpretations type nor the second set of NLU interpretations type may be identified and categorized as corresponding to sets of NLU interpretations types different from both the first set of NLU interpretations type and the second set of NLU interpretations type).

Data may be identified for processing (e.g., the data corresponding to the first set of NLU interpretations type, the data corresponding to the second set of NLU interpretations type, or the data that corresponds to neither the first set of NLU interpretations type nor the second set of NLU interpretations type), and, at step 1006, a determination may be made as to whether a specialized NLU interpretation selection model exists for the data identified for processing. For example, the data corresponding to the first set of NLU interpretations type may be identified for processing; at step 1006, a determination may be made that a specialized NLU interpretation selection model exists for the data corresponding to the first set of NLU interpretations type (e.g., the specialized NLU interpretation selection model specific to the first set of NLU interpretations type); at step 1008, the specialized NLU interpretation selection model (e.g., the specialized NLU interpretation selection model specific to the first set of NLU interpretations type) may be identified for processing the data corresponding to the first set of NLU interpretations type; and, at step 1010, the specialized NLU interpretation selection model (e.g., the specialized NLU interpretation selection model specific to the first set of NLU interpretations type) may be utilized to process the data corresponding to the first set of NLU interpretations type.

Additionally or alternatively, the data corresponding to the second set of NLU interpretations type may be identified for processing; at step 1006, a determination may be made that a specialized NLU interpretation selection model exists for the data corresponding to the second set of NLU interpretations type (e.g., the specialized NLU interpretation selection model specific to the second set of NLU interpretations type); at step 1008, the specialized NLU interpretation selection model (e.g., the specialized NLU interpretation selection model specific to the second set of NLU interpretations type) may be identified for processing the data corresponding to the second set of NLU interpretations type; and, at step 1010, the specialized NLU interpretation selection model (e.g., the specialized NLU interpretation selection model specific to the second set of NLU interpretations type) may be utilized to process the data corresponding to the second set of NLU interpretations type. Additionally or alternatively, the data that corresponds to neither the first set of NLU interpretations type nor the second set of NLU interpretations type may be identified for processing; at step 1006, a determination may be made that a specialized NLU interpretation selection model does not exist for the data that corresponds to neither the first set of NLU interpretations type nor the second set of NLU interpretations type; at step 1012, the generic NLU interpretation selection model may be identified for processing the data that corresponds to neither the first set of NLU interpretations type nor the second set of NLU interpretations type; and, at step 1014, the generic NLU interpretation selection model may be utilized to process the data that corresponds to neither the first set of NLU interpretations type nor the second set of NLU interpretations type.

One or more embodiments may be implemented in any conventional computer programming language. For example, embodiments may be implemented in a procedural programming language (e.g., "C") or an object-oriented programming language (e.g., "C++", Python). Some embodiments may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system. Such computer instructions may be written in a number of programming languages for use with one or more computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. Such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Some embodiments may be implemented as a combination of both software (e.g., a computer program product) and hardware. Still other embodiments may be implemented as entirely hardware, or entirely software (e.g., a computer program product).

A described "process" is the performance of a described function in a computer using computer hardware (such as a processor, domain-programmable gate array, or other electronic combinatorial logic, or similar device), which may be operating under control of software or firmware or a combination of any of these or operating outside control of any of the foregoing. All or part of the described function may be performed by active or passive electronic components, such as transistors or resistors. Use of the term "process" does not necessarily imply a schedulable entity, although, in some embodiments, a process may be implemented by such a schedulable entity. Furthermore, unless the context otherwise requires, a "process" may be implemented using more than one processor or more than one (single- or multi-processor) computer and it may be an instance of a computer program or an instance of a subset of the instructions of a computer program.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing devices and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:

receiving, by a computing device and in association with a dialogue process with a user, natural language input;

parsing the natural language input to determine:

a first portion of the natural language input corresponding to a first natural language understanding (NLU) model, a second portion of the natural language input corresponding to a second NLU model, and a third portion of the natural language input different from the first and second portions;

processing, using the first NLU model, the first portion of the natural language input;

processing, using the second NLU model, the second portion of the natural language input;

processing, using a third NLU model, the third portion of the natural language input;

determining a semantic interpretation corresponding to the natural language input; and generating, by the computing device and in association with the dialogue process with the user, output, wherein the output is based on the semantic interpretation.

2. The method of claim 1, wherein:

the first NLU model comprises a first specialized model;

the second NLU model comprises a second specialized model; and the third NLU model comprises a generic model.

3. The method of claim 1, further comprising determining that a specialized NLU model is available for the first portion of the natural language input.

4. The method of claim 1, further comprising determining that a specialized NLU model is available for the second portion of the natural language input.

5. The method of claim 1, further comprising identifying, based on the natural language input, the first NLU model.

6. The method of claim 1, further comprising identifying, based on the natural language input, the second NLU model.

7. The method of claim 1, wherein the third portion corresponds to neither the first NLU model nor the second NLU model.

8. The method of claim 1, further comprising:

determining a first interpretation of the first portion of the natural language input;

determining a second interpretation of the first portion of the natural language input; and comparing, using the first NLU model, the first interpretation and the second interpretation.

9. The method of claim 8, further comprising selecting, based on the comparing, the first interpretation or the second interpretation.

10. A method comprising:

receiving, by a computing device and in association with a dialogue process with a user, natural language input;

parsing the natural language input to determine:

a first portion of the natural language input corresponding to a first type of input, and a second portion of the natural language input that does not correspond to the first type of input;

processing, using a first natural language understanding (NLU) model corresponding to the first type of input, the first portion of the natural language input;

processing, using a second NLU model, the second portion of the natural language input; and generating, by the computing device and in association with the dialogue process with the user, output, wherein the output is based on the natural language input.

11. The method of claim 10, wherein:

the first NLU model comprises a specialized model; and the second NLU model comprises a generic model.

12. The method of claim 10, further comprising:

determining a first interpretation of the first portion of the natural language input;

determining a second interpretation of the first portion of the natural language input; and selecting, using the first NLU model, the first interpretation or the second interpretation.

13. The method of claim 10 further comprising identifying, based on the natural language input, the first NLU model.

14. The method of claim 10, wherein the natural language input comprises speech input.

15. The method of claim 10, further comprising determining that the second portion does not correspond to any one of a plurality of specialized models.

16. An apparatus comprising:

at least one processor, and memory storing instructions that, when executed by the at least one processor, cause the apparatus to:

receive, in association with a dialogue process with a user, natural language input;

parse the natural language input to determine:

a first portion of the natural language input corresponding to a first natural language understanding (NLU) model, and a second portion of the natural language input corresponding to a second NLU model;

process, using the first NLU model, the first portion of the natural language input;

process, using the second NLU model, the second portion of the natural language input;

determine a semantic interpretation corresponding to the natural language input; and generate, in association with the dialogue process with the user, output, wherein the output is based on the semantic interpretation.

17. The apparatus of claim 16, wherein: the first NLU model comprises a first specialized model; and the second NLU model comprises a second specialized model.

18. The apparatus of claim 16, wherein the instructions, when executed by the at least one processor, cause the apparatus to:

determine a first interpretation of the first portion of the natural language input;

determine a second interpretation of the first portion of the natural language input; and select, using the first NLU model, the first interpretation or the second interpretation.

19. The apparatus of claim 16, wherein the instructions, when executed by the at least one processor, cause the apparatus to:

parse the natural language input to determine a third portion of the natural language input different from the first and second portions;

determine a first interpretation of the third portion of the natural language input;

determine a second interpretation of the third portion of the natural language input; and select, using a generic NLU model, the first interpretation or the second interpretation.

20. The apparatus of claim 16, wherein the natural language input comprises received audio input.

* * * * *